United States Patent
Amde et al.

(10) Patent No.: US 8,208,513 B2
(45) Date of Patent: Jun. 26, 2012

(54) SPREAD-SPECTRUM RECEIVER AND RECEPTION METHOD

(75) Inventors: Manish Amde, La Jolla, CA (US); Rene L. Cruz, San Diego, CA (US); Kenneth Yun, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 243 days.

(21) Appl. No.: 12/294,543

(22) PCT Filed: Mar. 30, 2007

(86) PCT No.: PCT/US2007/008022
§ 371 (c)(1),
(2), (4) Date: Apr. 27, 2009

(87) PCT Pub. No.: WO2007/123766
PCT Pub. Date: Nov. 1, 2007

(65) Prior Publication Data
US 2009/0310651 A1 Dec. 17, 2009

Related U.S. Application Data

(60) Provisional application No. 60/788,306, filed on Mar. 31, 2006.

(51) Int. Cl.
*H04B 1/00* (2006.01)
(52) U.S. Cl. .... 375/147; 375/140; 375/130; 375/E1.002
(58) Field of Classification Search .................. 375/147, 375/E1.002, 140, 130
See application file for complete search history.

(56) References Cited

U.S. PATENT DOCUMENTS

| 5,450,453 | A | | 9/1995 | Frank |
| 5,642,377 | A | * | 6/1997 | Chung et al. .................. 375/145 |
| 6,115,409 | A | | 9/2000 | Upadhyay |
| 2002/0031109 | A1 | * | 3/2002 | Maru ............................ 370/342 |
| 2002/0054625 | A1 | * | 5/2002 | Matsumoto et al. .......... 375/152 |
| 2004/0071200 | A1 | | 4/2004 | Betz et al. |

OTHER PUBLICATIONS

Gardner, Floyd M., "A BPSK/QPSK Timing-Error Detector for Sampled Receivers", *IEEE Transactions on Communications*, vol. COM-34, No. 5, May 1986, pp. 423-429.

(Continued)

*Primary Examiner* — Shuwang Liu
*Assistant Examiner* — Michael Neff
(74) *Attorney, Agent, or Firm* — Greer, Burns & Crain Ltd.

(57) ABSTRACT

Receivers and reception methods conduct spread spectrum reception using the energy of multiple bits, preferably a substantial number of bits, in a packet for correct alignment of the spreading code at the receiver. Code acquisition, as well as packet detection and acquisition are provided by embodiments of the invention. Preferred embodiment receivers and reception methods provide packet detection at low SINR looking at energy of multiple bits of the packet, frame synchronization using short preamble, timing recovery at low SINR looking at energy of multiple bits of the packet, quick code acquisition using parallel search for all possible code phases, code acquisition at low SINR, and tracking of acquired timing and code phase. Preferred embodiment receivers and reception methods use the energy of multiple bits for making decisions.

17 Claims, 10 Drawing Sheets

OTHER PUBLICATIONS

Godard, Dominique N., "Passband Timing Recovery in an All-Digital Modem Receiver" *IEEE Transactions on Communications*, vol. COM-26, No. 5, May 1978, pp. 517-523.

Jamieson, Kyle, et. al.; "Understanding the Real-World Performance of Carrier Sense", *MIT Computer Science and Artificial Intelligence Laboratory*, pp. 52-57.

Milstein, Laurence B., "Interference Rejection Techniques in Spread Spectrum Communications", *Proceedings of the IEEE*. vol. 76, No. 6, Jun. 1988, pp. 657-671.

Mueller, Kurt H. "Timing Recovery in Digital Synchronous Data Receivers", *IEEE Transactions on Communications*, vol. COM-24, No. 5, May 1976, pp. 516-531.

Pickholtz, Raymond L., et al.; "Theory of Spread-Spectrum Communications—A Tutorial", *IEEE Transactions on Communications*, vol. COM-30, No. 5, May 1982, pp. 855-884.

Polydoros, Andreas, et al.; "Analysis and Optimization of Correlative Code-Tracking Loops in Spread-Spectrum Systems", *IEEE Transactions on Communications*, vol. COM-33, No. 1, Jan. 1985, pp. 30-43.

Takai, Mineo, et al.; "Effects of Wireless Physical Layer Modeling in Mobile Ad Hoc Networks", *UCKLA Computer Science Department*, 2001, pp. 87-94.

Ward, Robert B., "Acquisition of Pseudonoise Signals by Sequential Estimation", *IEEE Transactions on Communications*,vol. COM—No. 4, Dec. 1965, pp. 475-483.

Ward, Robert B., et al.; "Acquisition of Pseudonoise Signals by Recursion-Aided Sequential Estimation", *IEEE Transactions on Communications*, vol. COM-25, No. 8, Aug. 1977, pp. 784-795.

VIRTEX-4 FPGA User Guide, Dec. 1, 2008.

VIRTEX-II Pro and Virtex-II Pro X FPGA User Guide, Nov. 5, 2007.

\* cited by examiner

SPREAD-SPECTRUM RECEIVER AND RECEPTION METHOD

PRIORITY CLAIM

Applicants claim priority benefits under 35 U.S.C. §119 on the basis of Patent Application No. 60/788,306, filed Mar. 31, 2006.

TECHNICAL FIELD

A field of the invention is wireless communications.

BACKGROUND ART

Wireless data communications are subject to significant interference. Receivers and reception methods must overcome the noise to detect communications, acquire code for the communication, and synchronize to the communication. Difficulty increases along with increasing data rates and with decreasing power allocated for the data communication. Of course, high data rates are highly desirable. High data rates permit, for example, a laptop computer to quickly download documents and web pages through a wireless communications on a WiFi network. Cellular handsets, for example also benefit from high data rates. Receivers operating in such devices, however, desirably use little power for a variety of reasons, including extended operational time when operating on a portable power source such as a battery, and to reduce interference created by the receiver that can impact transmission.

A receiver operating in a typical wireless communication scheme experiences low signal to interference and noise ratio (SINR). Signal reception at low SINR poses many challenges. A popular strategy for transmitting and receiving in such an environment is known as spread spectrum communications. Data transmitted by a transmitter in a spread spectrum communication makes use of a clock and a pseudo random noise (PN) sequence to generate spreading code and data symbols. Spread spectrum communication techniques are popular for several reasons including resistance to narrowband interference and jamming, multipath rejection and suitability for multiple access schemes.

Currently deployed spread spectrum based communication networks, for example 802.11b, support high data rates at high signal to interference and noise ratio (SINR) for asynchronous packet-based communication. Asynchronous communications are advantageous since they don't require a separate pilot channel for synchronizing their communication to a pilot signal. In one-to-many downlink transmissions in cellular networks, for example IS-95, mobile handsets synchronize to a pilot signal sent by a base station. The synchronous communication using a pilot channel leads to the loss of power even in the absence of useful communication.

For accurate demodulation in asynchronous packet-based communication, a spread spectrum receiver needs to use the data transmission itself to synchronize to the carrier frequency and phase of the transmitted signal. This is typically achieved by adding a preamble in front of the data bits in a packet. Symbol detection at the receiver requires synchronization to the clock used at the transmitter for generating the spreading code and data symbols. It further requires discovering the start of the spreading sequence in the received signal for correct de-spreading operation at the receiver. Such synchronization involves two separate operations referred to as code acquisition and tracking.

The acquisition operation involves a search for the start of the pseudo random noise (PN) code in the received signal for precise de-spreading of the received signal. The tracking operation performs fine synchronization of the receiver clock to the clock used for generating the data symbols and spreading code at the transmitter. For coherent demodulation, the tracking operation also performs carrier recovery at the receiver. Tracking is performed after code acquisition as the SINR per chip is typically too low to accurately determine chip transitions without leveraging the spreading gain of the code acquisition operation. At low SINR, error correction techniques can be used for reliable estimation of transmitted data symbols even if a significant percentage of raw data symbols are erroneous.

Code acquisition requires testing all the possible hypotheses for correct alignment of the code phase in the received signal with a PN correlation used in the de-spreading operation for data symbol detection. This hypothesis testing is typically carried out in a serial manner as the hardware complexity, cost and size prohibit use of parallel correlators for reducing the acquisition time. Improving very large scale integration (VLSI) technology was long ago recognized as having the potential for a practical implementation of parallel correlator. See, R. L. Pickholtz, D. L. Schilling, and L. B. Milstein, "Theory of spread-spectrum comunications—a tutorial," IEEE Transactions on Communications, vol. COM-30, no. 5, pp. 855-884, May 1982. Despite a couple decades of improving VLSI technology, the serial correlation approach is still favored.

DISCLOSURE OF THE INVENTION

Receivers and reception methods conduct spread spectrum reception using the energy of multiple bits, preferably a substantial number of bits, in a packet for correct alignment of the spreading code at the receiver. Code acquisition, as well as packet detection and acquisition are provided by embodiments of the invention. Preferred embodiment receivers and reception methods provide packet detection at low SINR looking at energy of multiple bits of the packet, frame synchronization using short preamble, timing recovery at low SINR looking at energy of multiple bits of the packet, quick code acquisition using parallel search for all possible code phases, code acquisition at low SINR, and tracking of acquired timing and code phase. Preferred embodiment receivers and reception methods use the energy of multiple bits for making decisions.

BEST MODE OF CARRYING OUT THE INVENTION

Figure 1:
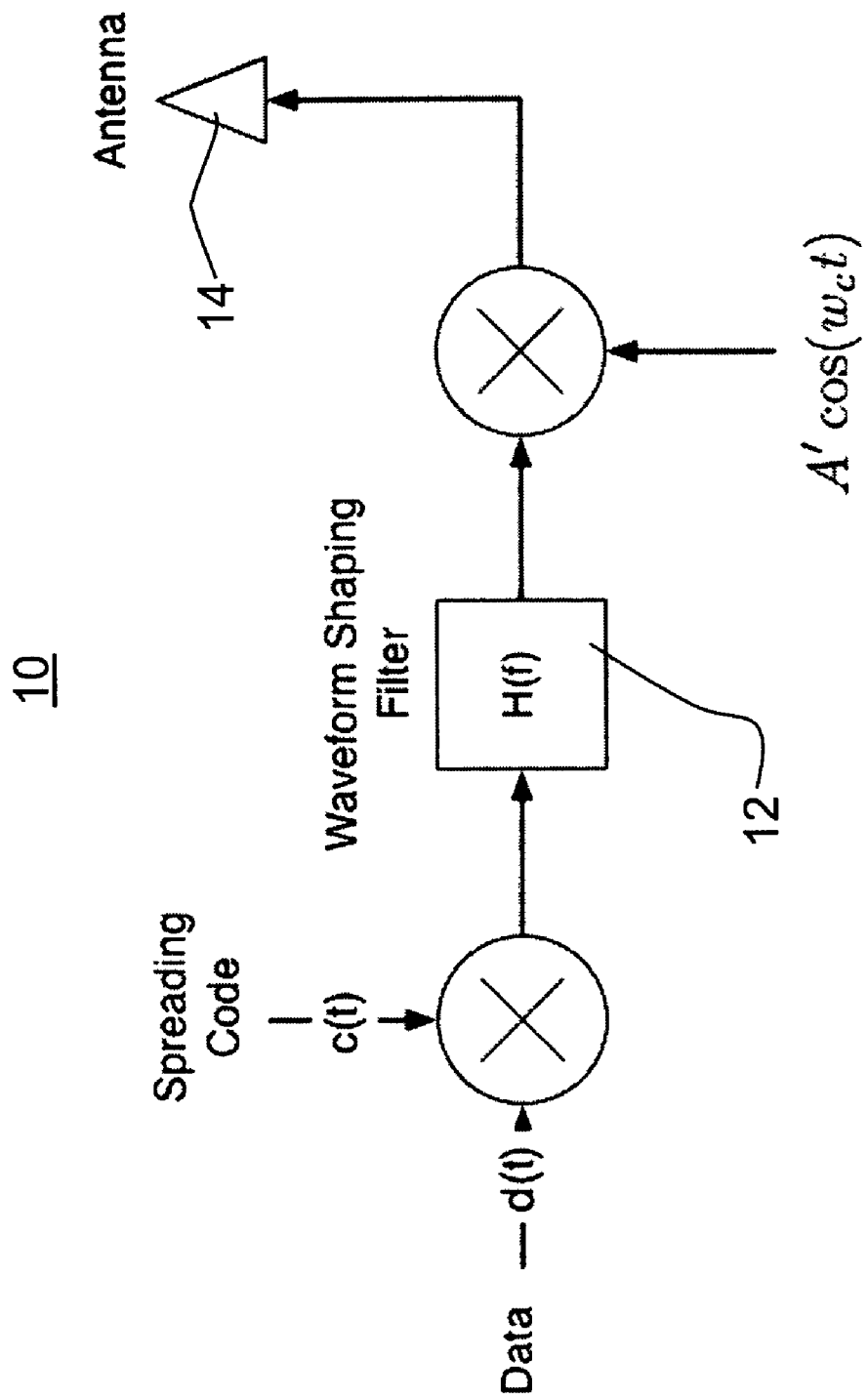
FIG. 1 is a block diagram illustrating a spread spectrum transmitter.

The invention provides a receiver and reception method that enable packet detection at low (e.g., <0 dB) signal-to-noise ratios without the use of external synchronization (i.e., asynchronous) with a receiver that has memory and power sufficient to analyze a signal stream substantially longer than a single bit. Unlike typical conventional receivers, which try to synchronize onto a noisy signal looking at the bit-stream bit-by-bit (so-called "latching"), receivers and reception methods of the invention look at multiple bits, and preferably a substantial portion of a signal stream, containing many bits, to determine how to latch to the signal. More power and memory is required at the receiver end, but latching onto significantly noisy (relative to the signal) signals is possible.

A preferred embodiment receiver and reception method of the invention provides a fully parallel VLSI implementation for code acquisition at low SINR. The implementation is based on the well-known post-detection integration method that is used in CDMA spread spectrum. Preferred embodiment receivers and reception methods employ the post-detection integration method to examine the energy of multiple bits, preferably a substantial number of bits, in a packet for correct alignment of the spreading code at the receiver.

A preferred embodiment receiver and reception method for synchronization enables packet acquisition at low (e.g., <0 dB) signal-to-noise ratio without the use of external synchronization using a receiver that has memory and power sufficient to analyze a signal stream much longer than a single bit. Typical conventional receivers try to synchronize onto a noisy signal looking at the bit-stream bit-by-bit, referred to as latching. A preferred embodiment receiver and reception method looks at a larger piece of the signal stream, which contains multiple bits and preferably many bits, to determine how to latch to the signal. While additional power and memory are required at the receiver end compared to bit-by-bit analysis of the stream, preferred embodiment receivers can latch onto much more noisy (relative to the signal) signals.

Preferred embodiment receivers and reception methods provide packet detection at low SINR looking at energy of multiple bits of the packet, frame synchronization using short preamble, timing recovery at low SINR looking at energy of multiple bits of the packet, quick code acquisition using parallel search for all possible code phases, code acquisition at low SINR, and tracking of acquired timing and code phase. Preferred embodiment receivers and reception methods use the energy of multiple bits for making decisions. Preferred embodiments are applicable to spread spectrum networks, and provide extended range, improved reliability, and low SINR operation for spread spectrum receivers.

Receivers and reception methods of the invention have a number of important applications in spread spectrum wireless communications. These include, for example, packet detection at low SINR; frame synchronization using short preamble; timing recovery at low SINR; quick code acquisition using parallel search for all possible code phases; code acquisition at low SINR; and tracking of acquired timing and code phase. These and other applications will be recognized by those skilled in the art.

The invention also provides packet acquisition at low SINR. A receiving and reception method of the invention provides for low SINR packet acquisition, where packet acquisition refers to correct reception of a packet transmission. In a spread-spectrum scenario packet acquisition involves accurate chip timing synchronization, PN code acquisition and tracking of the received input. According to embodiments of the invention, reliable packet acquisition can be obtained even if the raw data bits within the packet cannot be estimated reliably. In such instance, forward error correction codes can be used for a more reliable estimation of the original data bits encoded into a packet.

A preferred embodiment packet acquisition method of the invention acquires the packet by looking at all data samples during a packet transmission. The method is independent of the sequence of transmitted data bits, thereby eliminating the need for a lengthy preamble. The method detects the packet using a maximum likelihood ratio calculation based on the energy of the entire packet and generates soft decisions on data bits which can be used by a block decoder for forward error correction. In addition to basic utility of packet acquisition, packet acquisition methods of the invention have a number of additional interesting applications.

An example application is channel measurement between nodes that normally do not communicate directly. A packet acquisition method of the invention can support reliable reception of channel probe packets even between nodes that are too far away for normal data communications. This provides important information to enable intelligent network level resource allocations. Packet acquisition methods of the invention also provide support for out of band communications, i.e., using communication links whose range is far beyond the links used for data transfer. This provides an important tool for the engineering of fast and robust network discovery algorithms. Packet acquisition methods of the invention also provide for enhanced carrier sense in CSMA-based MAC protocols. A robust packet detection algorithm improves the efficiency and performance of MAC protocols that rely upon "carrier sense" for medium access.

Preferred embodiment receivers and reception methods will now be described with respect to the drawings. Artisans will recognize broader aspects of the invention from the preferred embodiments, as well as variations thereof from the description of the preferred embodiments. Drawings presented schematically will be understood by artisans with reference to the description.

FIG. 1 illustrates a typical spread spectrum transmitter 10. The transmitter in FIG. 1 uses direct sequence spread spectrum modulation, with Binary Phase Shift Keying (BPSK). With reference to the transmitter 10, a preferred embodiment code acquisition reception method will now be described. The signals at the transmitter and receiver will first be described, then code acquisition will be discussed.

Code Acquisition

Model for Transmitted Signal

Direct sequence spread spectrum modulation is assumed, with Binary Phase Shift Keying (BPSK) is used. The signal transmitted for a packet at baseband is x(t), where $$x(t)=d(t)c(t),$$

d(t) is the data signal and c(t) is the spreading signal. Both signals take on values in $\{-1, +1\}$.

The data packet has R bits, $b_1, b_2, \ldots, b_R$. The time duration of a bit transmission is T seconds. The data signal is defined as $$d(t) = \begin{cases} b_j, & \text{if } (j-1)T \leq t < jT \text{ where } 1 \leq j \leq R \\ 0, & \text{otherwise} \end{cases}$$

where $b_j \in \{-1, +1\}$

The processing gain is m and the chip duration is $T_c$ seconds, where $T_c = T/m$. In other words, m chips are sent per transmitted bit. The spreading sequence is a random sequence of m*R chips and it is known at the receiver. The $i^{th}$ chip is $c_i \in \{-1, +1\} \forall i$. The spreading signal is defined as $c(t) = c_i$, if $(i-1)T_c \leq t < iT_c$.

The baseband signal x(t) is passed through a linear pulse shaping filter 12 H(f) with impulse response h(t) to reduce interchip interference (ICI) and limit the signal to its allocated spectrum. It is finally up-converted to a RF frequency $\omega_c$ and transmitted through an antenna 14.

The transmitted signal is $$s(t) = A'(x(t)*h(t))\cos(\omega_c t),$$

where A' is an amplitude parameter that determines the transmission power.

Model for Received Signal

Figure 2:
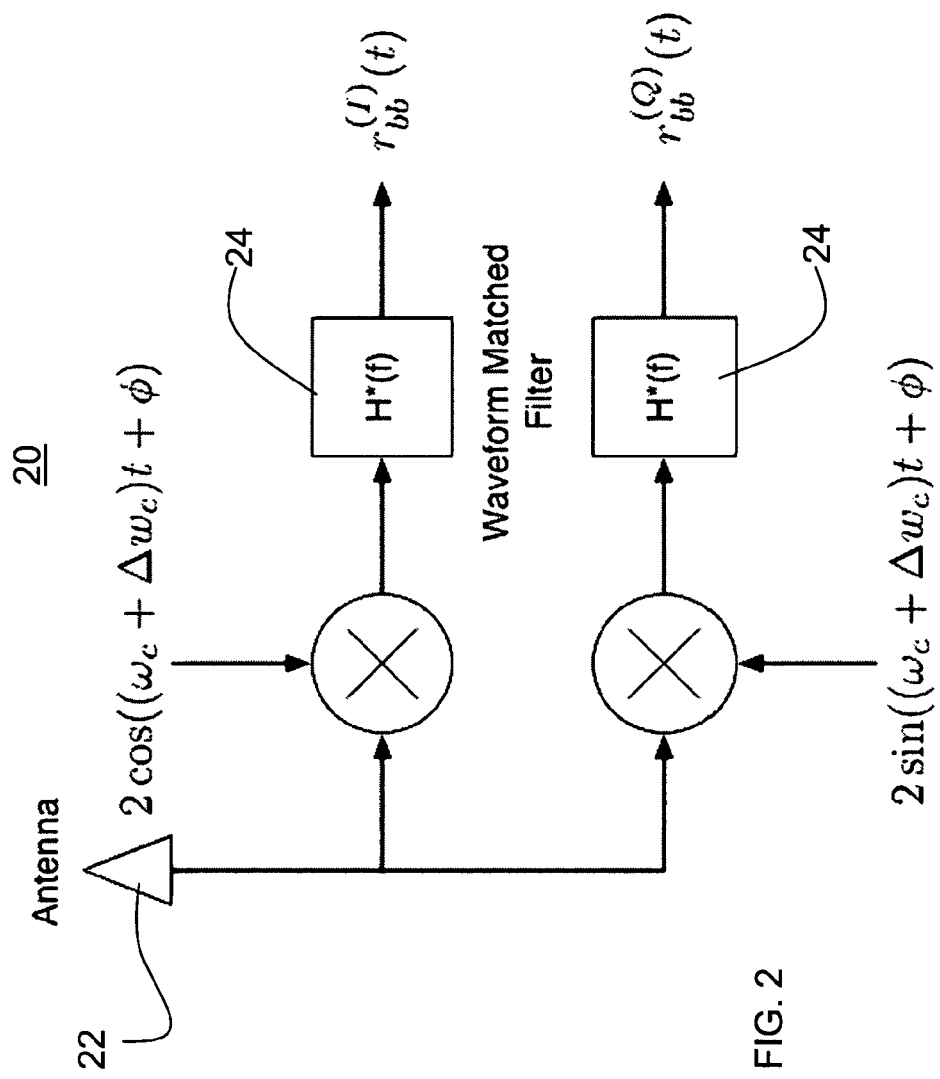
FIG. 2 is a block diagram illustrating down converting and matched filtering steps used in a preferred embodiment spread spectrum receiver and reception method.

The received signal r(t) received by a receiver 20, as seen in FIG. 2, at an antenna 22 is represented by $$r(t) = as(t-t_0) + v(t) + n(t)$$

where a is the signal attenuation factor, v(t) is an interference signal caused by other packet transmissions, n(t) is additive white Gaussian noise and $t_0$ is a time offset denoting the start of packet transmission. To simplify further explanations and expressions, $t_0$ is assumed to be equal to zero.

The received signal can be written as $$r(t) = A(x(t)*h(t))\cos(\omega_c t) + V(t),$$

where $A = A'*a$ and $V(t) = v(t) + n(t)$ is assumed to be a zero mean Gaussian random process.

Down-Conversion and Matched Filtering

The receiver RF signal is down-converted into two in phase and quadrature branches (I and Q) using oscillators at frequency offset $\Delta\omega_c$, and phase offset $\phi$ with respect to the carrier of the received signal. The oscillators for the I and Q branches operate at the same frequency and are 90° out of phase (they are typically generated using a single oscillator for the I branch and an appropriate delay element before the Q branch). Each is then passed through a matched filter 24 H*(f) which is matched to the pulse shaping filter used at the transmitter 10. The corresponding signal received at baseband can be written as $$r_{bb}^{(I)}(t) = Ax(t)\cos(\Delta w_c t + \phi) + V^{(I)}(t),$$

$$r_{bb}^{(Q)}(t) = Ax(t)\sin(\Delta w_c t + \phi) + V^{(Q)}(t),$$

where $V^{(I)}(t)$ and $V^{(Q)}(t)$ are assumed to be zero mean Gaussian random processes with variance $V_o/2$.

Energy Detection

Figure 3:
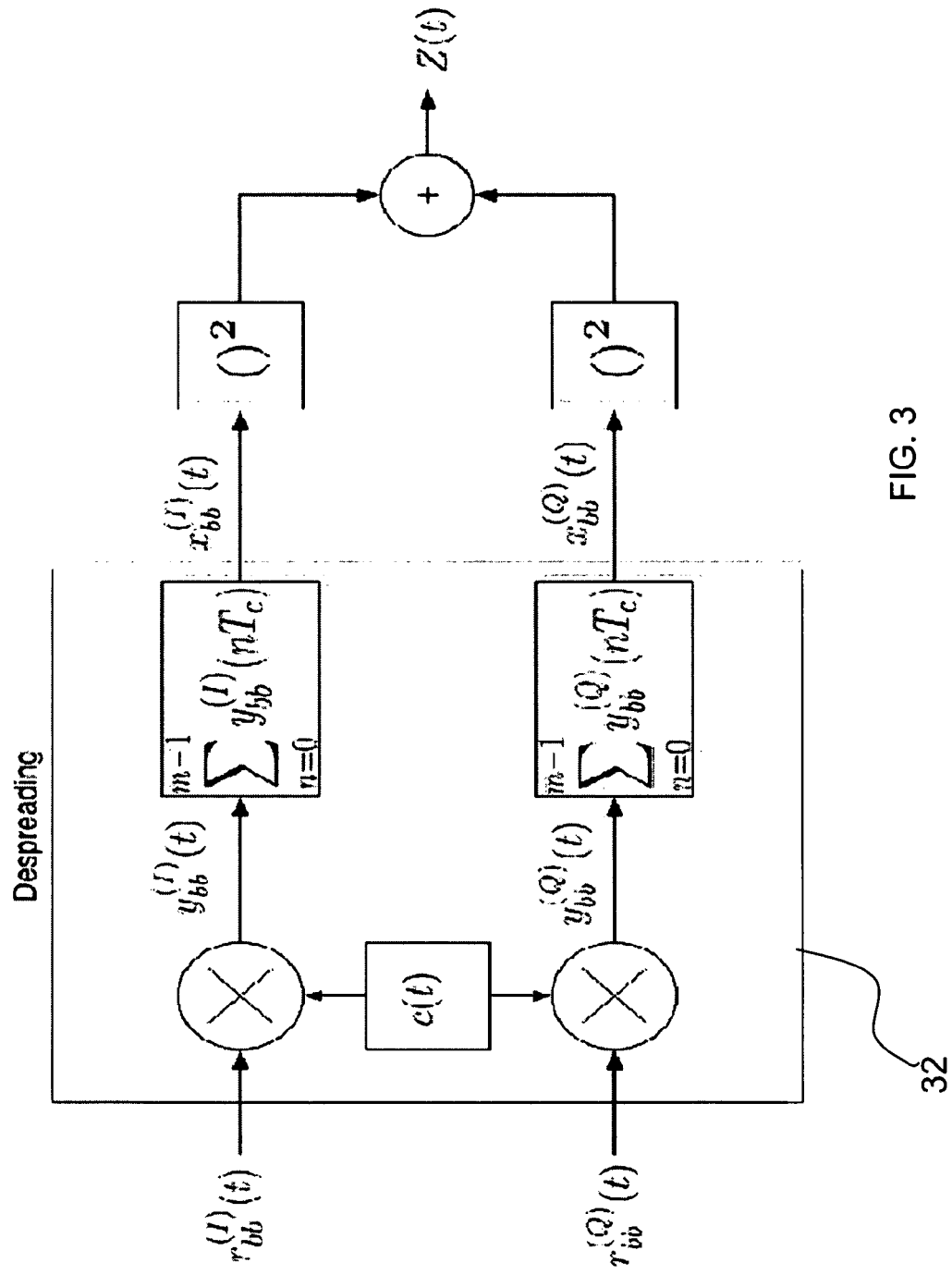
FIG. 3 is a block diagram illustrating energy detection steps used in a preferred embodiment spread spectrum receiver and reception method of the invention.

The detection of a signal with an unknown phase can be accomplished using a non-coherent detector 30 shown in FIG. 3. Both baseband signals $r_{bb}^{(I)}(t)$ and $r_{bb}^{(Q)}(t)$ are passed through a de-spreading correlator 32 and then combined (addition of squares) to detect the energy of the signal. The general detection structure is referred to as a quadratic detector or energy detector.

Under perfect code alignment, the outputs of the despreader are $$x_{bb}^{I}(t) \approx Am \cos(\Delta w_c t + \phi) R(\tau) + I(t)$$

$$x_{bb}^{Q}(t) \approx Am \sin(\Delta w_c t + \phi) R(\tau) + I(t)$$

where I(t) is zero mean Gaussian process with variance V/2 and $V = mV_0$. $R(\tau)$ is the auto-correlation of the PN sequence and accounts for the chip timing error even at correct alignment of code phase and m is the number of chips per bit. The chip timing error is rectified in the tracking phase which typically follows code acquisition.

The average value of the energy detector output at perfect code alignment is given by $$E[Z(t)] = E[(x_{bb}^{(I)}(t))^2 + (x_{bb}^{(Q)}(t))^2] = M_D^2 = m^2 A^2 R^2(\tau)$$

This detector is analyzed for probability of detection ($P_D$) given a probability of false alarm ($P_{FA}$) and SINR $\mu$ defined as $M_D^2/V$. Nonlimiting examples of probability equations are provided in A. J. Viterbi, Code Division Multiple Access—Principles of Spread Spectrum Communication, Addison-Wesley, 1995.

Limitations on Long PN Correlation

The SINR $\mu$ described above is directly proportional to the spreading gain m. The underlying assumption for correct de-spreading is that the frequency error $\Delta\omega_c$ satisfies the condition $m\Delta\omega c T \ll \pi$ where T is the period for each bit. This condition ensures that the remnant carriers after down-conversion cos $(\Delta\omega_c t + \phi)$ and sin $(\Delta\omega_c t + \phi)$ have the same sign over the entire de-spreading operation with a high probability.

Hardware complexity and cost prevent the use of a unique PN sequence across the packet. Therefore, many spread spectrum systems use the same PN sequence to encode every data bit.

Post Detection Integration

Postdetection integration (PDI) is a method to improve probability of detection $P_D$ for a given probability of false alarm $P_{FA}$ and SINR $\mu$ by using multiple observations. Embodiments of the invention define a variable $D_{quad}(t)$ that can be used as a test statistic for the quadratic detector where $$D_{quad}(t) = \sum_{i=0}^{L-1} Z(iT)$$

L is the number of bits summed over (equivalent to number of observations). Z is the energy of the transmitted signal and i is an integer value. T is the time period for a data symbol and is equal to $m*T_c$ where m is the spreading ratio and $T_c$ is the chip period. This operation in essence looks at the energy of multiple bits in a packet.

The probability of false alarm is given by $$P_{FA} = e^{-\theta/V} \sum_{k=0}^{L-1} \frac{(\theta/V)^k}{k!}$$

and the probability of detection is given by $$P_D = \int_{\theta/V}^{\infty} \left(\frac{x}{L\mu}\right)^{(L-1)/2} e^{-(x+L\mu)} I_{L-1}(2\sqrt{L\mu x}) dx$$

where $\theta$ is the threshold for code acquisition and $I_{L-1}()$ is the $(L-1)^{th}$ order modified Bessel function.

The integral for $P_D$ is the $L^{th}$-order Marcum Q-function. This integral can be analyzed for large L in using GramCharlier series. It can be shown that for fixed probability of detection $P_D$ and probability of false alarm $P_{FA}$, the minimum SINR required is proportional to $\sqrt{L}$. For example, if the minimum SINR required for a particular $P_D$ and $P_{FA}$ under a single observation (L=1) is $\alpha$, then to have the same $P_D$ and $P_{FA}$ for the SINR level at $\alpha/10$, the number of observations need to be repeated hundred times (L=100).

Since the performance of the PDI detector improves with the length of the summation L, one could theoretically improve performance (albeit at the risk of increasing hardware cost) by summing over the total number of bits in the packet (L=R). This assumes perfect chip timing recovery at the receiver 20 which is typically conducted after the code acquisition phase. Therefore, the optimal number of bits to be summed over for detection is dependent on the relative drift between the clocks used for chip generation at the transmitter 10 and receiver 20. Once the clocks drift by more than a chip period, the code phase changes and subsequent addition of bits does not improve performance ($R(\tau)=0$ for $|\tau|>T_c$)).

Multiple bit code acquisition of the invention has been described in continuous time above. Artisans will recognize that the baseband section of the reception can be implemented in digital reconfigurable logic using a field programmable gate array (FPGA). This requires a digital-to-analog and analog-to-digital conversion for interfacing the FPGA to RF transceivers which transmit and receive signals over the wireless medium.

A digital implementation of code acquisition described above computes the algorithm output every Ts=Tc/n seconds where Tc is the period per chip, Ts is the analog to digital converter (ADC) sampling period and n is the number of samples per chip. This leads to a completely parallel implementation of code acquisition and a low acquisition time as a parallel search is performed over all possible code phases in the packet.

Typical spread spectrum radios perform code acquisition before carrier recovery for low SINR operation. In preferred embodiments of the invention, the PLL operation on the FPGA is performed after the code acquisition stage.

A reduced complexity implementation for the code acquisition algorithm can use the following test statistic $$D_{abs}(t) = \sum_{i=0}^{L-1} |x_{bb}^{(l)}(i(T)|$$

This detector sums the absolute values of the de-spreader output $x_{bb}^{l}(t)$ for detecting energy using multiple bits. L is the number of bits summed over (equivalent to number of observations). Z is the energy of the transmitted signal and i is an integer value. The performance of the code acquisition algorithm using this detector and the implementation of a completely parallel architecture which simultaneously looks at all the possible code phase alignments over multiple bits in a packet has been evaluated.

Performance Evaluation

Performance of code acquisition consistent with the above embodiments was evaluated through offline processing of measured data obtained from wired transmission through attenuators. The attenuators were set such that the received signal level is −110 dBm, measured at the receiver antenna output. A packet transmitter and a digital IF samples receiver were implemented on a Virtex-4 FX FPGA on the Memec Virtex-4 FX LC development kit. This FPGA is interfaced to a computer using Gigabit Ethernet for collection of large blocks of data at extremely fast rates for offline processing. This makes the data acquisition prototype low-cost and mobile, and eliminates the requirement for expensive and bulky deep memory logic analyzers. An evaluation board for the AD9862 chip, a Mixed Signal Front-End (MxFE) Processor from Analog Devices, is used for converting a digital signal from the FPGA board to an analog intermediate frequency (IF) signal as well as for converting an analog IF signal to digital. On the transmit (Tx) path, the MxFE has two 14-bit 128 MSPS D/A converters and digital mixers for frequency up-conversion. On the receive (Rx) path, the MxFE has two 12-bit A/D converters that could sample up to 64 MSPS. The output of the DAC and the input of the ADC are centered at 44 MHz. The MxFE board is interfaced to a transceiver evaluation board from RFMagic, which works at the RF frequency of 2.4 GHz (ISM band). On the RF side, this board is interfaced to commercially available antennas or an attenuator for controlled tests. The received samples from the ADC are sent to the computer where they are stored for analysis. The code acquisition is implemented in software and its performance is analyzed using the stored samples. $D_{abs}(t)$ were computed off-line every sampling period for data obtained from actual packet transmissions received by the RF front end hardware and data collection system. In this implementation, n=16 samples/chip, m=50 chips/bit and the packet length R along with the observation interval L is equal to 40 bits. The received signal consists of on-off packet transmission at regular, equally-spaced intervals. A triangular envelope depicted the algorithm output when the packet slides in and out of the PDI detector. The peak of each envelopes coincides with the correct time for code acquisition and is obtained by looking at the energy of all the bits in the packet. Results were obtained for a continuous packet transmission with no interval between consecutive transmissions. Close-up detail of the peaks within the packet transmission time interval showed that the peaks recur after every m*n=800 sampling periods, i.e. one bit period. These results show that the algorithm is able to effectively process low-level signals obtained from our prototype data collection system.

Hardware Prototype

The detection part of the code acquisition method was also implemented on a digital prototyping board that hosts a Xilinx Virtex-II Pro (XC2VP20) FPGA on it. The board provides all the necessary functionalities for a complete wireless MAC and PHY layer implementation. A brief summary of the FPGA implementation is shown in Table 1. For understanding these parameters one can refer to the Virtex-II Pro documentation. The same AD9862 and RFMagic evaluation boards discussed above completed the transceiver. The area utilized on the FPGA is proportional to the spreading ratio (m) and number of bits of the packet observed by the algorithm (L).

| Logic Distribution | Used | Avail. | Utilized |
| --- | --- | --- | --- |
| Number of 4-Input LUTs | 4054 | 18560 | 21% |
| Number of BRAMs | 85 | 88 | 96% |
| Number of bonded IOBs | 28 | 556 | 5% |

Experiment Settings

The following parameters were used in experiments. A data rate was used of 40 Kbps and a packet length of 5 bytes (R=40). In experiments the code acquisition method looks at the energy of the entire packet (L=40). The chipping rate is 2 MHz (m=50) and the sampling rate is 64 MHz (n=32).

The transmitter continuously transmits packets with a zero time interval between packets. The test was conducted over a wireless channel with an input signal of −110 dBm measured at the antenna output of the receiver.

The output of the code acquisition was examined using the Chipscope Pro software from Xilinx, which provides an on-chip debug and real-time logic analysis environment. The output was examined proportional to $D_{abs}(t)$, at random intervals of time for a duration of 4096 sampling cycles. Our plots showed the highest peak is at 181 units. The second highest peak which could be attributed to a multi-path component is around 110 units and also repeats every 1600 sampling cycles. Peaks were observed repeating every 1600 sampling cycles (n×m=32×50=1600) which, as expected, is equal to one bit period.

Packet Detection and Acquisition

As another example embodiment, packet detection and acquisition of a receiver and reception method will now be discussed. The transmitter 10 is as in FIG. 1, and the model for the transmitted signal is as described above.

Model for Received Signal

The received signal r(t) received by receiver 20 is represented by $$r(t) = as(t-t_0) + v(t) + n(t)$$

where $\alpha$ is the signal attenuation factor, v(t) is an interference signal caused by other packet transmissions, n(t) is additive white Gaussian noise and $t_0$ is a time offset denoting the start of packet transmission.

This signal is down converted to baseband, passed through a low pass filter with bandwidth equal to the signal bandwidth. It is then sampled at rate $f_s = 1/T_s = n/T_c$, where n is a positive integer that is at least 2. The result is a discrete time base-band signal $r_{in}[k]$, which can be approximately written as $$r_{in}[k] = \frac{1}{T_s} \int_{(k-i)T_s}^{kT_s} r(\tau) d\tau.$$

Since the chip waveform is a rectangular pulse, the matched filter can be implemented as an integrate-and-dump circuit. In particular, one can sum consecutive values of $r_{in}[k]$ to implement the integration. Multibit packet detection and acquisition uses a new sequence {r[k]} by summing n consecutive values of $r_{in}[k]$, i.e.

$$r[k] = \sum_{i=k}^{k+n-1} r_{in}[k]$$

The new r[k]'s are calculated every sampling cycle in order to identify the correct alignment of chips in the packet.

Decision Variables

Without loss of generality, the problem of designing a detection algorithm to decide between whether a packet is present with a time offset $t_0$ of zero is addressed. As input to the detection algorithm, form l decision variables $z_1, z_2, \ldots, z_l$ where l is number of bits in the packet. The decision variables are defined as $$z_j = \sum_{i=(j-1)m+1}^{jm} c_i r[(i-1)n+1]$$

The $z_j$'s are calculated every sampling cycle and are prospective candidates for the de-spread data bit at position j. Note that the decision vector $\vec{z} = (z_1, z_2, \ldots, z_l)$ can be computed easily from the sequence {r[k]}.

Hypothesis $H_1$ is situation where perfect synchronization is achieved at the receiver. Under this hypothesis all the $z_j$'s are de-spread data bits for the current alignment in time. In this case, let $g_1^j(z_j)$ be the conditional probability density function of $z_j$. The conditional density of $\vec{z}$ under $H_1$ is $$f_1(\vec{z}) = \prod_{j=1}^{l} g_1^j(z_j)$$

Now under $H_1$ we have $$\begin{aligned} z_j &= \sum_{i=(j-1)m+1}^{jm} c_i r[(i-1)n+1] \\ &= \sum_{i=(j-1)m+1}^{jm} c_i(aAnb_j c_i + v_i + n_i) \\ &= \sum_{i=(j-1)m+1}^{jm} aAnb_j + \hat{n}_i \\ &= aAnmb_j + N_j \\ &= \delta b_j + N_j \end{aligned}$$

Where $\delta = \alpha Anm$, $\hat{n}_i = c_i(v_i + n_i)$, $v_i$ and $n_i$ are the appropriate terms corresponding to interference and thermal noise, and $$N_j = \sum_{i=(j-1)m+1}^{jm} \hat{n}_i.$$

Assume $N_j$ is a zero mean Gaussian random variable with variance $\sigma_N^2$. Assume $\text{Prob}\{b_j=1\} = \text{Prob}\{b_j=-1\} = 1/2$ for $1 \leq j \leq l$, which results in $$g_1^j(z_j) = \left(\frac{1}{2}\right) \frac{1}{\sqrt{2\pi}\,\sigma N} e^{-(z_j - \delta)^2/2\delta_N^2} + \left(\frac{1}{2}\right) \frac{1}{\sqrt{2\pi}\,\sigma N} e^{-(z_j - \delta)^2/2\delta_N^2}$$

Next, the null hypothesis $H_0$ is the situation where no packet is sent, i.e., r(t)=v(t)+n(t). Assume that the conditional density of $\vec{z}$ under $H_0$ is $$f_0(\vec{z}) = \prod_{j=1}^{l} g_0^j(z_j)$$

Where $g_0^j(z_j)$ is the conditional probability density function of $z_j$ under $H_0$. Thus, for $1 \leq j \leq l$.

$$g_0^j(z_j) = \frac{1}{\sqrt{2\pi}\,\sigma N} e^{-(z_j)^2/(2\delta_N^2)}$$

To make a decision between $H_1$ and $H_0$ given observation of $\vec{z}$, calculate the log likelihood ratio $h(\vec{z})$, where $$h(\vec{z}) = \log\left(\frac{f_1(\vec{z})}{f_0(\vec{z})}\right) = \sum_{j=1}^{l} \log\left(\frac{g_1^j(z_j)}{g_0^j(z_j)}\right) = \sum_{j=0}^{N} k(z_j)$$

where $$k(z_j) = \log\left(\frac{g_1^j(z_j)}{g_0^j(z_j)}\right)$$

Thus, under hypothesis $H_l$, the expected value of the likelihood ratio is $$E_1[h(\vec{z})] = l\int_{-\infty}^{\infty} g_1^{-1}(z_1) k(z_1) dz$$

Similarly, under hypothesis $H_0$, the expected value of the likelihood ratio is $$E_0[h(\vec{z})] = l\int_{-\infty}^{\infty} g_0^{-1}(z_1) k(z_1) dz$$

The values of $E_1[h(\vec{z})]$ and $E_o[h(\vec{z})]$ depend on the given parameters. The main idea is that $E_1[h(\vec{z})] \gg E_0[h(\vec{z})]$ so that the value of $h(\vec{z})$ can be used to decide whether or not a packet is present with an offset of zero.

Moreover, considering the hypothesis that a packet it is present, but that $\Delta > T_c$ (i.e., one chip duration), it can be shown that the expected value of $h(\vec{z})$ under this hypothesis is equal to $E_0[h(\vec{z})]$. This is due to the assumption that data bits and chips are uncorrelated. For values of $t_0$ between 0 and $T_c$, it can be seen that the expected value of $h(\vec{z})$ varies linearly between the values $E_1[h(\vec{z})]$ and $E_0[h(z)]$. Thus, a peak in the value of $[h(\vec{z})]$ gives an indication of the correct time alignment for a packet, if a packet is present.

Acquisition and Detection

A parameter used in packet detection and acquisition is a threshold $\eta$ which is determined experimentally. Every sampling period, i.e., $T_s$ seconds, the value of $h(\vec{z})$ is calculated. If $h(\vec{z}) < \eta$, then decide a packet is not present at the current alignment of time. If $h(\vec{z}) \geq \eta$, then look for a peak in the value of $h(\vec{z})$ over the next $nT_s$ seconds. When $h(\vec{z})$ is maximized over a window of $nT_s$ seconds, declare a packet is present at the corresponding alignment of time.

The condition $h(\vec{z}) \geq \eta$ ensures code acquisition at the receiver. Maximization of the ratio over n samples, where n is the number of samples per chip, ensures that the output of the integrate-and-dump matched filter is maximized for highest SINR. The peak detection over a window of $nT_s$ seconds is similar to a chip timing recovery procedure, and that the estimated time alignment of an arriving packet is the one which maximizes the likelihood that a packet is present with that alignment.

When a packet is declared present, the values of $z_1, z_2, \ldots, z_n$ can be used as data bits depending on their polarity. For better performance in low SINR environments, the transmitted data can be encoded and $z_1, z_2, \ldots, z_n$ can be fed as input to a soft decision block decoder, which attempts to decode the packet.

To test the performance of the several simulations involving a sequence of packets at different SINR levels, packet sizes and spreading gains were run. The short packet is composed of 9 data bits and the long packet has 23 data bits. The spreading ratio(m) used was 50 (unless mentioned otherwise) and there were 8 samples per chip(n). In generating the subsequent results, the value for the threshold $\eta$ is determined experimentally from data and is adjusted for each SINR level. The algorithm looks at all the samples in a packet transmission.

Figure 4:
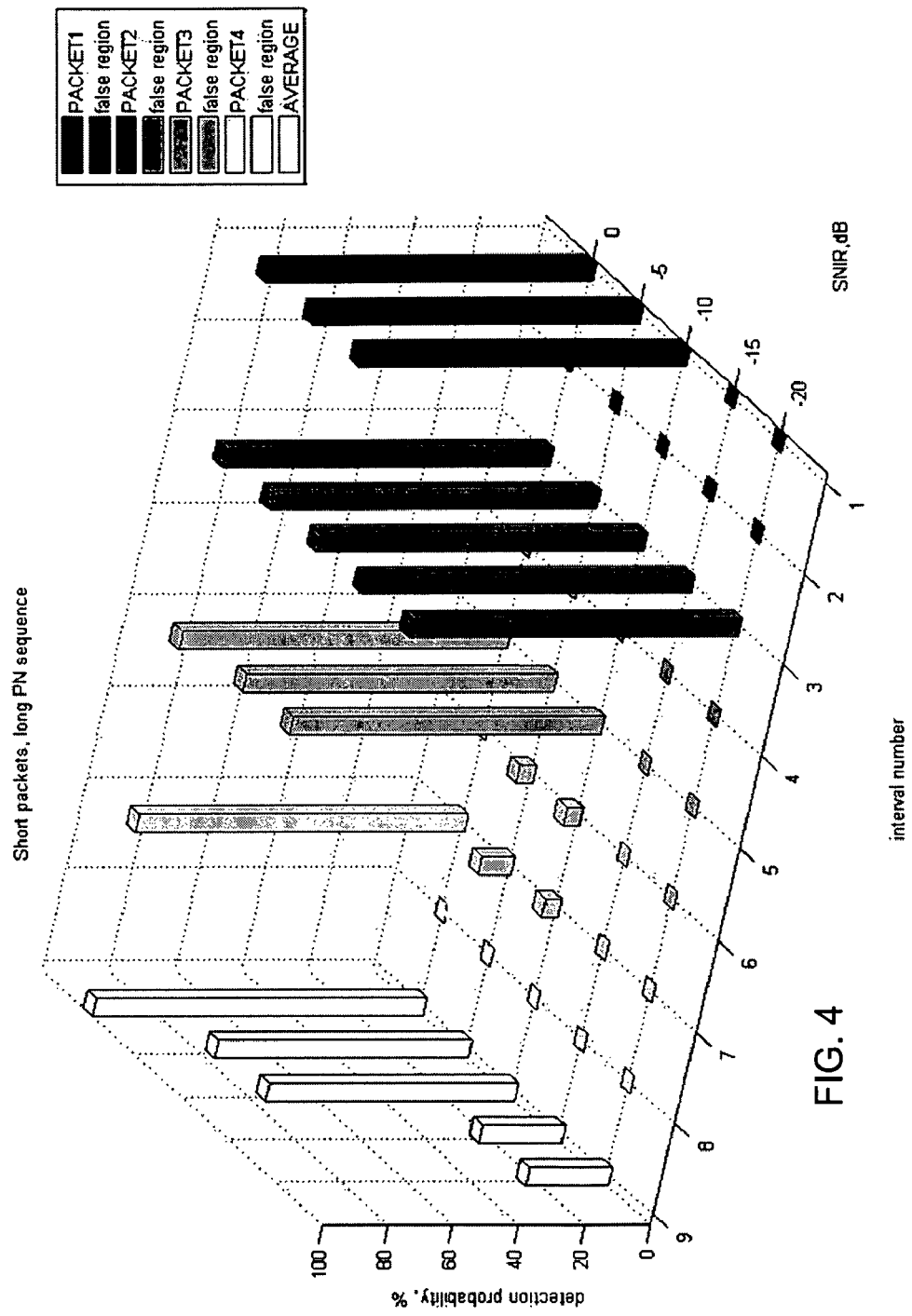
FIG. 4 shows simulation results of a packet detection reception method embodiment of the invention for short packets with a spreading ratio 50.
Figure 5:
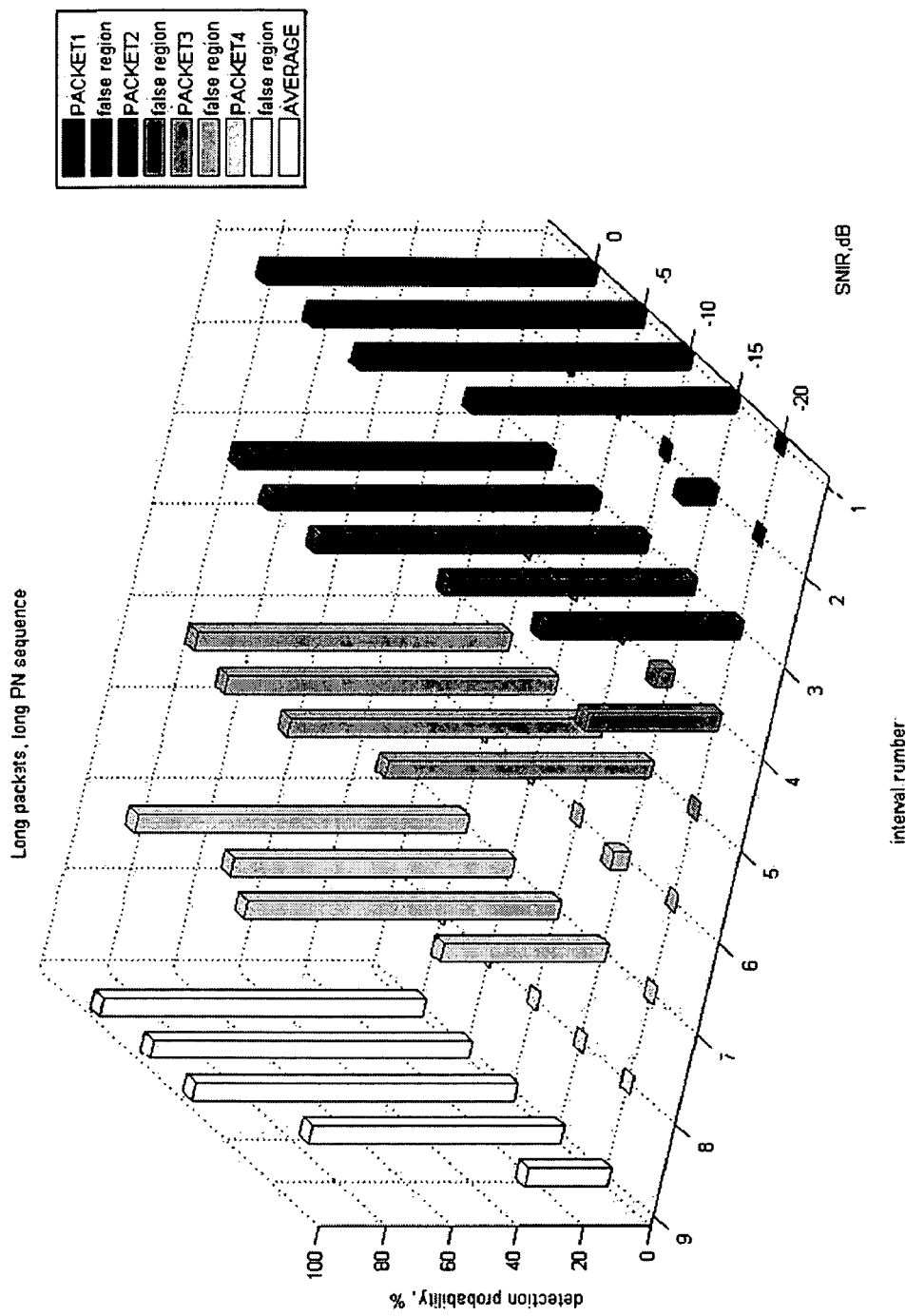
FIG. 5 shows simulation results of a packet detection reception method embodiment of the invention for long packets with a spreading ratio 50.

FIGS. 4 and 5 show simulations for short and long packets, respectively. The plots are interpreted as histograms over bins centered at the instance of packet transmission, obtained from 100 runs at each SINR value. There are 4 packets in the transmission marked by time intervals 1, 3, 5 and 7 which correspond to PACKET1, PACKET2, PACKET3 and PACKET4, respectively. Time intervals in between are areas with no packet transmission. Thus, non-zero histogram values in these so-called false regions indicate frequency of false alarms. The average detection probability is also included in the leftmost section of the figures. This is computed as the average of the histograms values at intervals 1, 3, 5 and 7. The probability of detection generally decreases with lower SINR, as expected. It is observed that packets can be reliably detected by the algorithm even at relatively low SINR values (−10 dB to 0 dB) for both long and short packets, however it is verified that long packets are detected more reliably than short packets across all SINR levels.

Figure 6:
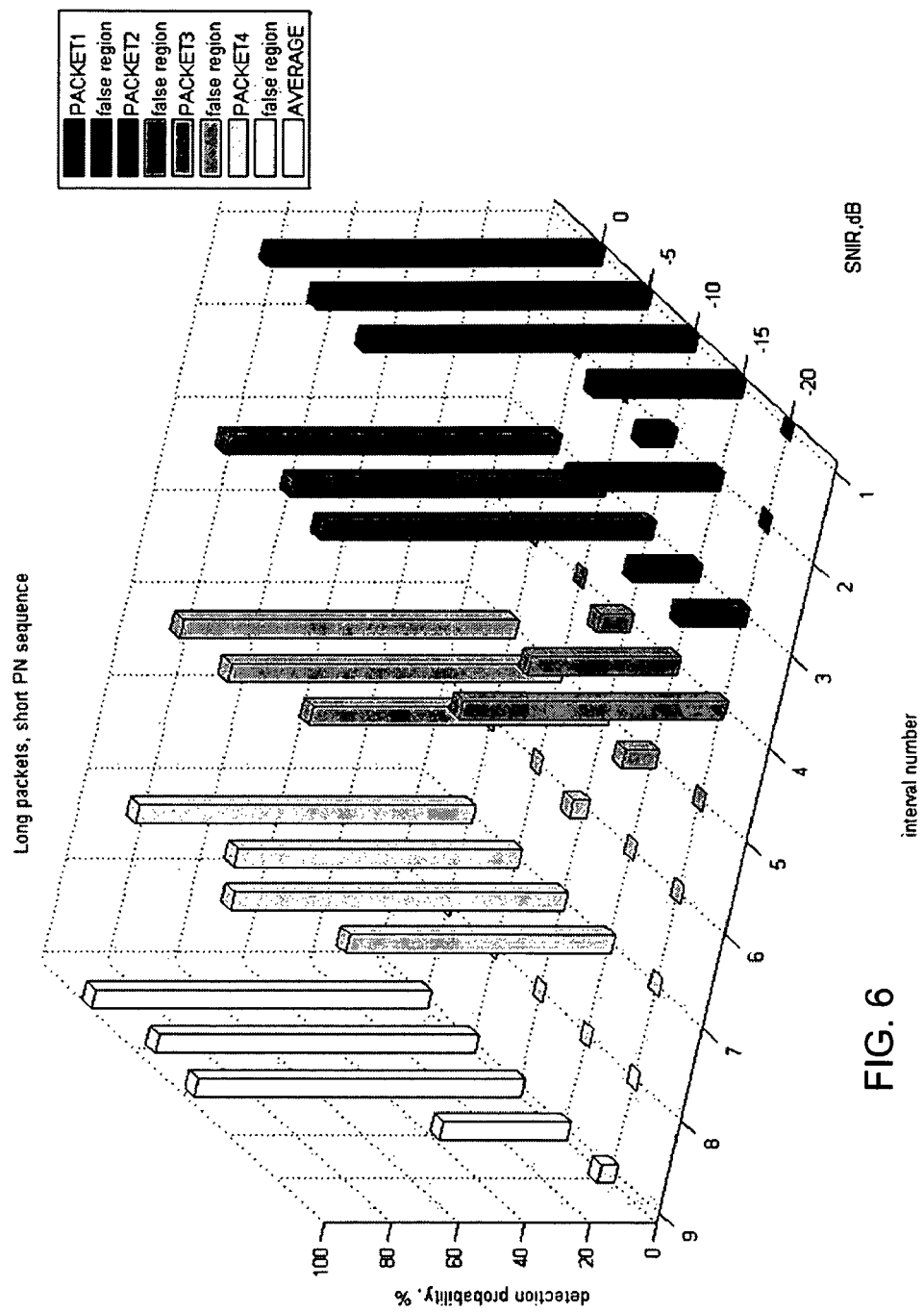
FIG. 6 shows simulation results of a packet detection reception method embodiment of the invention for long packets with a spreading ratio 10.

FIG. 6 shows the performance of the algorithm using a short PN sequence (10 chips) with long packets. Based on the average detection performance, there is noticeably poorer performance compared to the longer PN sequence, as expected. The use of a shorter spreading sequence translates to smaller processing gain, which impacts the detection especially at low SINR (between −15 to −20 dB).

Figure 7:
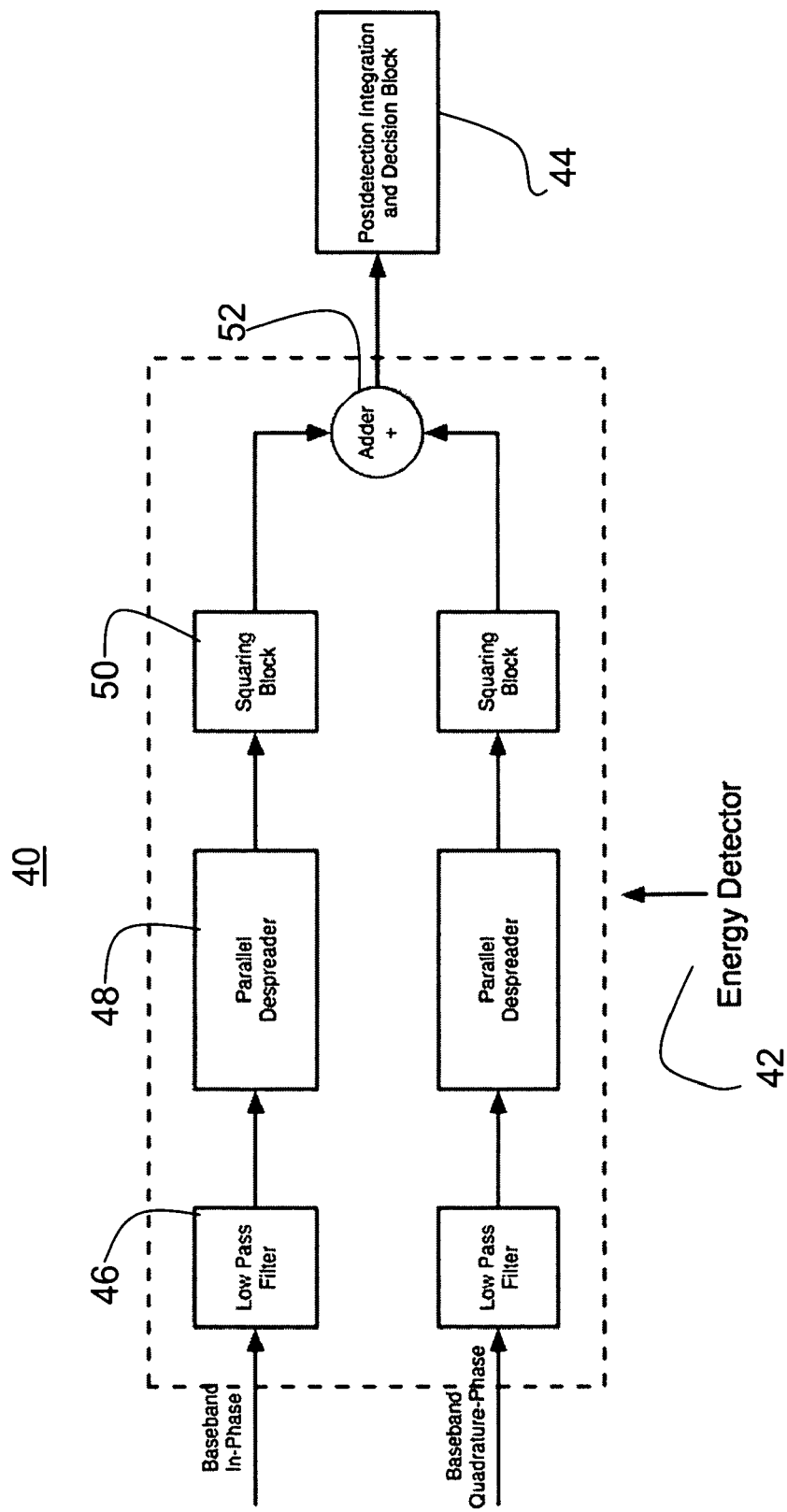
FIG. 7 shows an exemplary VLSI code acquisition and packet detection architecture, according to an embodiment of the present invention.

FIG. 7 shows an exemplary VLSI architecture 40 for a code acquisition and packet detection method. The architecture 40 includes an energy detector block 42 for parallel code acquisition This energy detector block 42 outputs to a postdetection integration and decision block 44.

Within the energy detector block, each of baseband in-phase and baseband quadrature-phase components inputs to a low pass filter 46, a parallel despreader 48, a squaring block 50, and an adder 52 for adding outputs from the squaring block. The low pass filter 46 removes high frequency noise from the baseband I and Q branches. It is typically, but not necessarily, implemented as a finite impulse response (FIR) filter. The parallel despreader 48 correlates a spreading code with all possible code phases of the filtered baseband I and Q branches at the granularity of the sampling period. This may be achieved, for example, by performing correlation (despreading) for each code phase alignment in parallel. Each parallel correlator uses pipelining to store and retrieve partial correlation values for performing correlation over all possible code phases.

The squaring block 50 squares the correlation values from the output of the parallel despreader 48, for both the I and Q branches. This can be implemented in multiple ways depending on the choice of hardware and resource constraints. One exemplary implementation could use a multiplier for the squaring operation. Such a multiplier itself can be implemented in various ways—for example, using a Wallace tree structure. Another exemplary implementation of the squaring block 50 calculates the squared values for all possible inputs offline and then implements squaring using a Look-up Table (LUT) that stores the squared values for all the input data.

The adder 52 performs the addition of squared I and Q correlation values corresponding to the same time alignment of the spreading code. It can be implemented in many ways, including but not limited to commonly-used structures such as carry-save adder, carry-lookahead adder, carry-select adder, etc.

The adder 52 output is input to the postdetection integration and decision block 44. The exemplary postdetection integration and decision block 44 sums a fixed number of adder outputs that are spaced apart by one bit period. This achieves the summation of energy over multiple bits and improves the detection probability for correct code phase alignment at a fixed probability of false alarm. Summation over multiple bits preferably is also used for making decision over detection of an incoming packet. This block also may be used to make a decision on whether code acquisition and packet detection have been accomplished using thresholds.

More specific features of the exemplary architecture 40 will now be discussed with respect to FIGS. 8-10. For the architecture features shown in FIGS. 8-10, the following parameters are used, as a nonlimiting example:

Oversampling=number of samples per chip=n=32
Spreading ratio=m=50
Number of bits summer over by a post-detection integration (PDI) operation=length of summation=l=40

Figure 8:
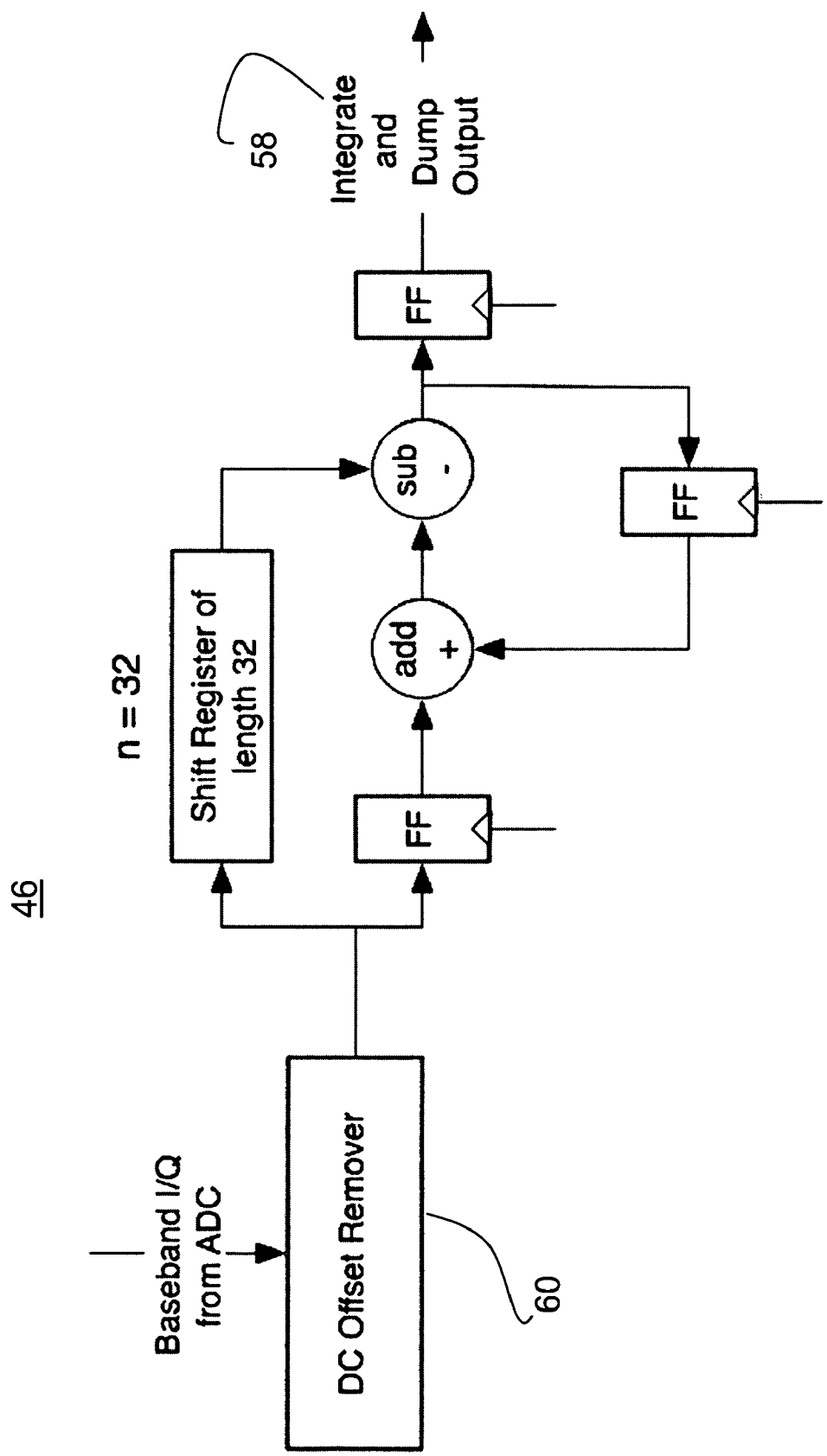
FIG. 8 shows an exemplary low pass filter embodiment of the invention.

FIG. 8 shows an exemplary implementation of the low pass filter (LPF) 46 using digital logic. The baseband in-phase (I) and quadrature-phase (Q) signals are obtained after RF downconversion (e.g., as shown in FIG. 2). The signals are further converted from analog to digital format using an analog-to-digital converter (ADC) (not shown), which provides digital samples of the down-converted signals. The exemplary LPF 46 provides an output 58 via an Integrate and Dump operation by adding over the last "n" samples, where "n" is the number of ADC samples available per chip. The sampling rate of the ADC is typically higher than the chipping rate. In other words, a single received chip is sampled at multiple instants and provided as digital baseband I and Q data. A DC offset remover 60 removes DC offset from the ADC data. One of ordinary skill in the art will appreciate that this may be done in various ways. Flip-flops (FF) are used for representing a register.

Figure 9:
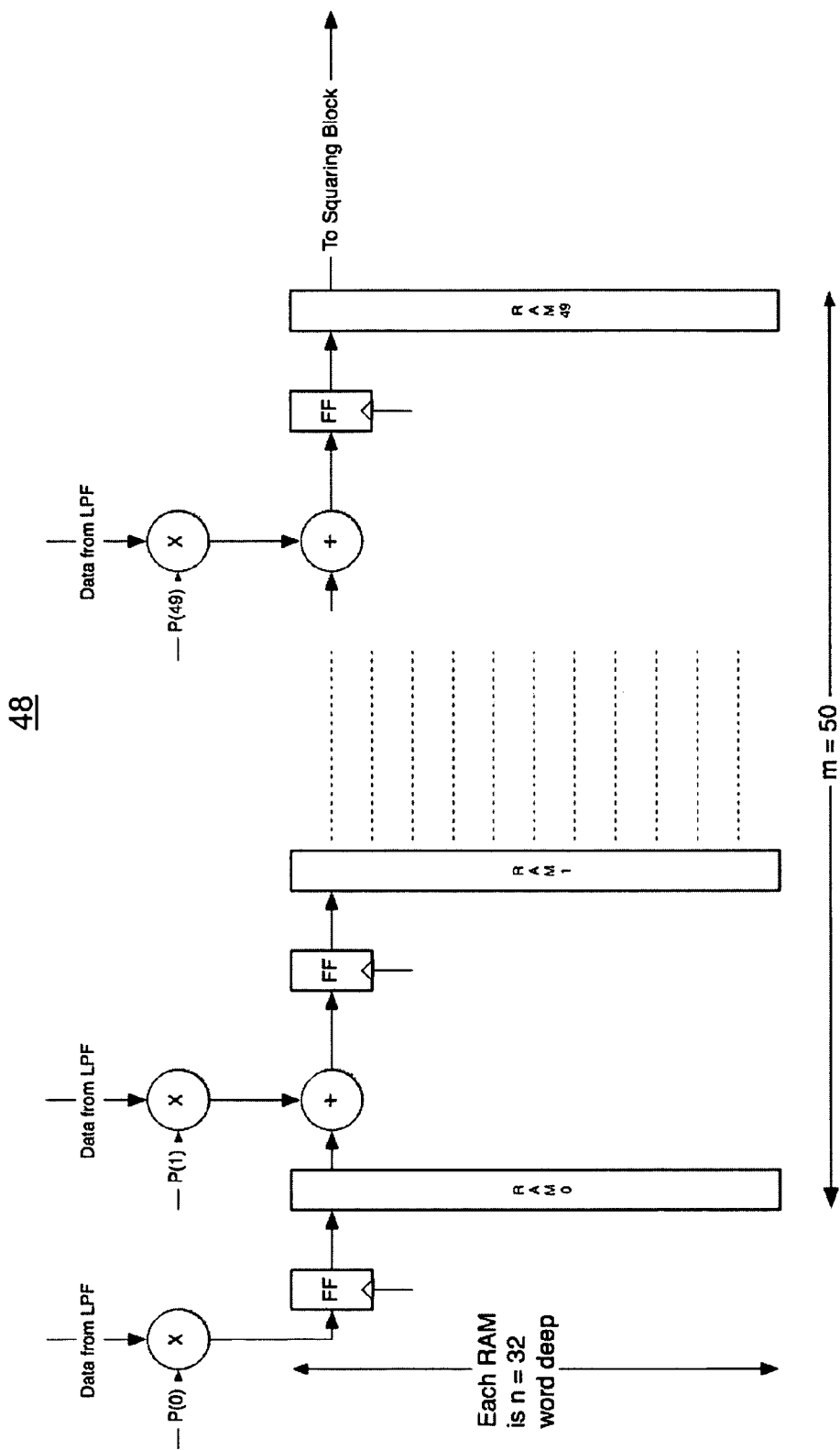
FIG. 9 shows an exemplary parallel despreader of the invention.

FIG. 9 shows an exemplary implementation for the parallel despreader using digital logic. Using the exemplary parameters set out above, the spreading code is m=50 chips long and repeats every chip period. The chips are represented as P={P(0), P(1), ... P(49)}, where each element of P is +1 or −1. Let us denote the input to this block, which is the output of the LPF block 46 in discrete time, as d[k], where k is the current sampling period. The parallel despreader calculates the following output c[k] for all k $$c[k]=d[k]*P(49)+d[k-m]*P(48)+ \ldots +d[k-(48*m)]*P(1)+d[k-(49*m)]*P(0)$$

The complete correlation (despreading) operation is carried out in a pipelined manner by storing partial correlations in RAMs and re-using the partial correlations after one chip period to calculate a new full correlation c[k] every sampling period. For example, RAM0 stores the partial correlation d[k−(49*m)]*P(O). This data is re-used after 32 sampling periods; i.e., one chip period to store the partial correlation d[k−(48*m)]*P(1)+d[k−(49*m)]*P(0) in RAM1. Finally, after m=50 chip periods or m*n=50*32=1600 sampling periods, the complete correlation c[k] is stored in RAM49 and finally sent out to the squaring block 52.

In this exemplary embodiment, each RAM includes 32 unique memory locations, where n=32 is the number of samples per chip. This allows the parallel code acquisition architecture 40 to work at the granularity of samples. Put another way, the architecture 40 helps find the correct code phase at the receiver within a region of one sampling period.

The next adjacent address location is written into the RAM every sampling cycle, returning to the same address location after 32 sampling cycles (i.e., one chip period). During the write to a RAM location, which overwrites the stored data at that location, the stored data is read out over the output of the RAM to aid the next partial correlation operation. In exemplary embodiments, by using pipelining, a partial correlation value for a given code phase need only be computed every chip period. The RAMs are used to store these partial correlation values for the time duration of one chip period. Partial correlation values preferably are computed every sampling period. For clarity, the addressing scheme is not shown in FIG. 9.

The number of different RAMs required for the exemplary parallel despreading block 48 is m=50. This may be a bottleneck in some implementations. A large spreading ratio could lead to a large number of unique RAMs required on a chip due to the high memory read/write bandwidth used by this exemplary architecture.

Figure 10:
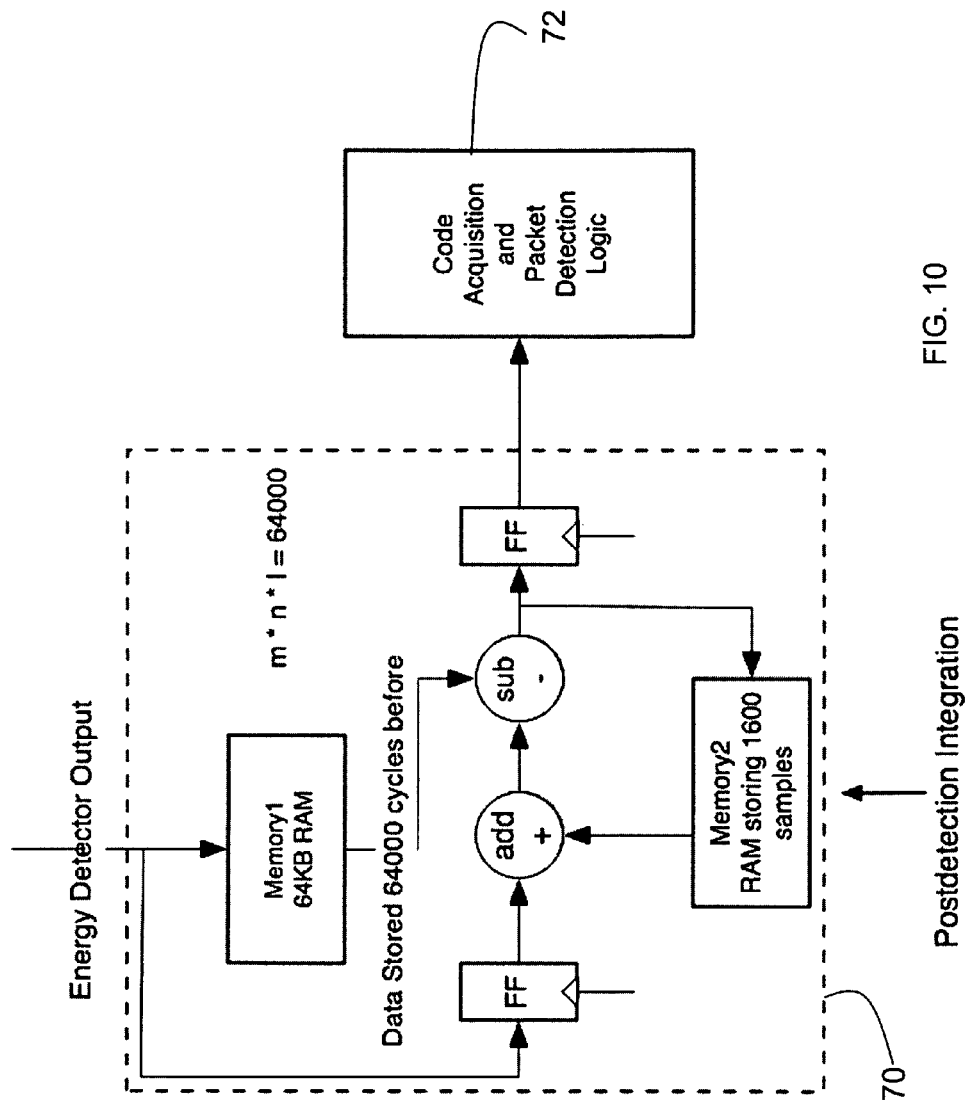
FIG. 10 shows an exemplary postdetection integration and decision block of the invention.

FIG. 10 shows an exemplary embodiment for the postdetection integration and decision block 44. A postdetection integration (PDI) block 70 receives output from the energy detector 42. The PDI block 70 includes a 64 KB RAM (m*n*l=64000), where "l" is the number of bits used for the postdetection integration (PDI) operation, referred to as Memory1. Memory1 is used to store the output samples from the energy detector 42 over the entire PDI operation. In an exemplary embodiment, every address location in Memory1 is read and written into periodically every 64000 sampling cycles in a serial manner, ensuring parallel PDI-based code acquisition at the granularity of a sampling period.

Another RAM storing 1600 samples, referred to as Memory2, is used like a shift register. Its size is defined by the number of samples in a bit (m*n=1600). Memory2 is used to aid the PDI operation for summing over multiple bits. It stores the PDI values for all possible code phases (over a bit period) at the granularity of one sampling period. In an exemplary operation, an address location is read from Memory2 every sampling period for calculating a new PDI value. The new PDI value is obtained by adding the current energy detector output to, and subtracting the oldest stored energy detector output in the Memory1 from, the PDI value read from Memory2. The new PDI value is written to the same address location in Memory 2 from which the old PDI value was read. In an exemplary embodiment, every address location in Memory2 is read and written into periodically every 1600 sampling cycles in a serial manner, ensuring parallel PDI-based code acquisition at the granularity of a sampling period.

Code acquisition and packet detection logic 72 uses a threshold for deciding whether code acquisition has been accomplished. Moreover, the maximum output over an entire chip period (i.e., over "n" sampling periods) is used as the correct alignment of code phase at the receiver. The code acquisition and packet detection logic 72 also uses a different threshold for deciding whether a packet is detected.

An alternative exemplary architecture may be similar to architecture 40, but modified in that the in-phase component alone may be used, and the squaring operation (squaring block 50) may be replaced by an absolute value operation. An exemplary absolute value operator may be, for example, suitable logic for performing an absolute value operation. If only the in-phase component is used, the adder block 52 may be removed. Such an alternative architecture may be used for code acquisition and/or packet detection and acquisition.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

The invention claimed is:

1. A method for reception of a spread spectrum signal, the method comprising steps of:
receiving a transmitted signal with an unknown phase;
detecting an energy of the transmitted signal and producing observations of bits from the energy of the transmitted signal;
determining a probability of signal detection in the step of detecting given a probability of false alarm and a signal to interference and noise ratio; and
conducting post-detection integration over multiple observations of bits in the transmitted signal to adjust the probability of signal detection and to acquire a code of the transmitted signal, wherein said step of detecting comprises defining a variable $D_{quad}(t)$ that can be used as a test statistic for quadratic detection where $$D_{quad}(t) = \sum_{i=0}^{L-1} Z(iT)$$

L is a number of the observations of bits, Z is the energy of the transmitted signal, i is an integer value, T is a time period for a data symbol and is equal to m*$T_c$ where m is a spreading ratio and $T_c$ is a chip period, such that energy of multiple bits in a packet are used to provide the observations of bits.

2. The method of claim 1, wherein said step of detecting comprises passing in phase and quadrature signals through a de-spreading correlator and adding squares of the in phase and quadrature signals to produce the observations of bits in the signal.

3. The method of claim 1, wherein said step of conducting post-detection integration is conducted over multiple bits in a packet up to all of the bits in the packet.

4. The method of claim 3, wherein the multiple bits comprises an optimal number of bits that is dependent upon the total drift between a clock used in said step of receiving and clock used to transmit the transmitted signal.

5. The method of claim 1, wherein said detecting, determining, and conducting post-detection integration are independent of a sequence of transmitted data bits in the transmitted signal.

6. The method of claim 1, wherein said step of detecting comprises:
de-spreading the transmitted signal to produce a de-spread signal;
summing values of the de-spread signal to detect energy using multiple bits and acquire the code of the transmitted signal.

7. The method of claim 6, wherein said step of summing sums the absolute values of the de-spread signal.

8. The method of claim 6, wherein said steps of receiving, de-spreading, and summing are conducted after a further step of recovering the carrier of the transmitted signal.

9. The method of claim 1, wherein said detecting comprises:
using the energy of multiple bits in the signal stream, conducting quick code acquisition using parallel search for all possible code phases.

10. The method of claim 9, wherein said step of conducting quick code acquisition comprises:
during every sampling period, determining a log likelihood ratio of a conditional probability density function of decision variables formed for the signal stream;
comparing the log likelihood ratio to a threshold;
deciding whether the code is acquired based upon the step of comparing;
when the code is acquired according to said step of deciding, finding a peak of the log likelihood ratio over a time period and declaring code acquisition when the log likelihood ratio is maximized over the time period.

11. The method of claim 9, wherein said step of conducting quick code acquisition further comprises tracking of acquired timing and code phases.

12. The method of claim 1, wherein said step of detecting comprises:
using the energy of multiple bits in the signal stream, conducting packet detection.

13. The method of claim 12, wherein said step of conducting packet detection comprises:
during every sampling period, determining a log likelihood ratio of a conditional probability density function of decision variables formed for the signal stream;
comparing the log likelihood ratio to a threshold;
deciding whether a packet is present based upon the step of comparing;
when a packet is present according to said step of deciding, finding a peak of the log likelihood ratio over a time period and declaring a packet present when the log likelihood ratio is maximized over the time period.

14. The method of claim 13, further comprising:
determining a start of the packet based on the peak of the log likelihood ratio.

15. The method of claim 12, further comprising a step of using corresponding decision variables as data bits after a packet is declared present.

16. The method of claim 12, further comprising a step of using corresponding decision variables as input to a soft decision decoder after a packet is declared present.

17. A method for reception of a spread spectrum signal, the method comprising steps of:
receiving a transmitted signal with an unknown phase;
detecting an energy of the transmitted signal, de-spreading the transmitted signal and producing observations of bits from the energy of the transmitted signal;
determining a probability of signal detection in the step of detecting given a probability of false alarm and a signal to interference and noise ratio; and
conducting post-detection integration over multiple observations of bits in the transmitted signal to adjust the probability of signal detection and to acquire a code of the transmitted signal, wherein said step of detecting comprises defining a variable $D_{abs}(t)$ that can be used as a test statistic for quadratic detection where $$D_{abs}(t) = \sum_{i=0}^{L-1} |x_{bb}^{(l)}(i(T))|$$

$x_{bb}^l(t)$ is a de-spread version of the transmitted signal, L is a number of the observations of bits, i is an integer value, T is a time period for a data symbol and is equal to m * $T_c$ where in is a spreading ratio and $T_c$ is a chip period, such that energy of multiple bits in a packet are used to provide the observations of bits.

* * * * *

UNITED STATES PATENT AND TRADEMARK OFFICE
CERTIFICATE OF CORRECTION

PATENT NO. : 8,208,513 B2  
APPLICATION NO. : 12/294543  
DATED : June 26, 2012  
INVENTOR(S) : Amde et al.

Page 1 of 1

It is certified that error appears in the above-identified patent and that said Letters Patent is hereby corrected as shown below:

In the Specification:

| | |
|---|---|
| Col. 6, line 26 | Delete "$\Delta\omega_c$," and insert --$\Delta\omega_c$-- therefor. |
| Col. 7, line 21 | Delete "($R(\tau) = 0$ for $|\tau| > T_c$))" and insert --($R(\tau) = 0$ for $|\tau| > T_c$)-- therefor. |
| Col. 7, line 45 | Delete "$D_{obs}(t) = \sum_{i=0}^{L-1} |x_{bb}^{(l)}(i(T)|$" and insert --$D_{abs}(t) = \sum_{i=0}^{L-1} |x_{bb}^{(l)}(i(T)|$-- therefor. |
| Col. 8, line 29 | Before "coincides" delete "lopes" and insert --lope-- therefor. |
| Col 10, line 5 | Between "is" and "situation" insert --a--. |
| Col. 11, line 36 | Delete "$E_0[h(z)]$" and insert -- $E_0[h(z)]$ -- therefor. |
| Col. 12, line 37 | Before "This energy" insert a --.--. |
| Col. 13, line 22 | Delete "summer" and insert --summed-- therefor. |
| Col. 13, line 58 | Delete "P(O)" and insert --P(0)-- therefor. |

Signed and Sealed this  
Thirteenth Day of August, 2013

Teresa Stanek Rea  
*Acting Director of the United States Patent and Trademark Office*